(12) United States Patent
Watson et al.

(10) Patent No.: US 8,388,420 B1
(45) Date of Patent: Mar. 5, 2013

(54) APPARATUS AND METHOD FOR EXTRACTING CRUSTACEAN MEAT

(75) Inventors: Johnny Watson, New Orleans, LA (US); Melvin L. Arroyo, Gretna, LA (US)

(73) Assignee: Armac Industries, Inc., Gretna, LA (US)

( * ) Notice: Subject to any disclaimer, the term of this patent is extended or adjusted under 35 U.S.C. 154(b) by 0 days.

(21) Appl. No.: 13/486,163

(22) Filed: Jun. 1, 2012

(51) Int. Cl.
*A22C 29/02* (2006.01)

(52) U.S. Cl. .......................................... 452/10

(58) Field of Classification Search ................ 452/9, 10, 452/12, 13
See application file for complete search history.

(56) References Cited

U.S. PATENT DOCUMENTS

| | | | |
|---|---|---|---|
| 1,565,342 A | | 11/1924 | Umbrath |
| 1,533,018 A | * | 4/1925 | Lieberman ...................... 452/10 |
| 1,565,341 A | * | 12/1925 | Umrath ........................... 452/10 |
| 2,104,027 A | * | 1/1938 | Dubus ............................. 452/10 |
| 3,229,325 A | | 1/1966 | Amelang |
| 3,597,792 A | * | 8/1971 | Lockerby ........................ 452/10 |
| 4,562,616 A | * | 1/1986 | Hoelzel .......................... 452/10 |
| 4,572,988 A | * | 2/1986 | Handler et al. ........... 315/209 R |
| 4,752,988 A | | 6/1988 | Guglielmo et al. |
| 5,011,453 A | * | 4/1991 | Lapeyre et al. ................. 452/10 |
| 5,149,294 A | * | 9/1992 | Storesund ...................... 452/10 |

* cited by examiner

*Primary Examiner* — Richard Price, Jr.
(74) *Attorney, Agent, or Firm* — Keaty Law Firm LLC

(57) ABSTRACT

Crustacean meat is extracted from crustacean body using centrifugal force. Cooked crustaceans, such as crabs, have their top shells and claws removed, while retaining the legs and the abdomen shells with the meat inside the shells. The crab portions are placed in a rotating cage and spun to cause separation of the meat from the shell.

27 Claims, 6 Drawing Sheets

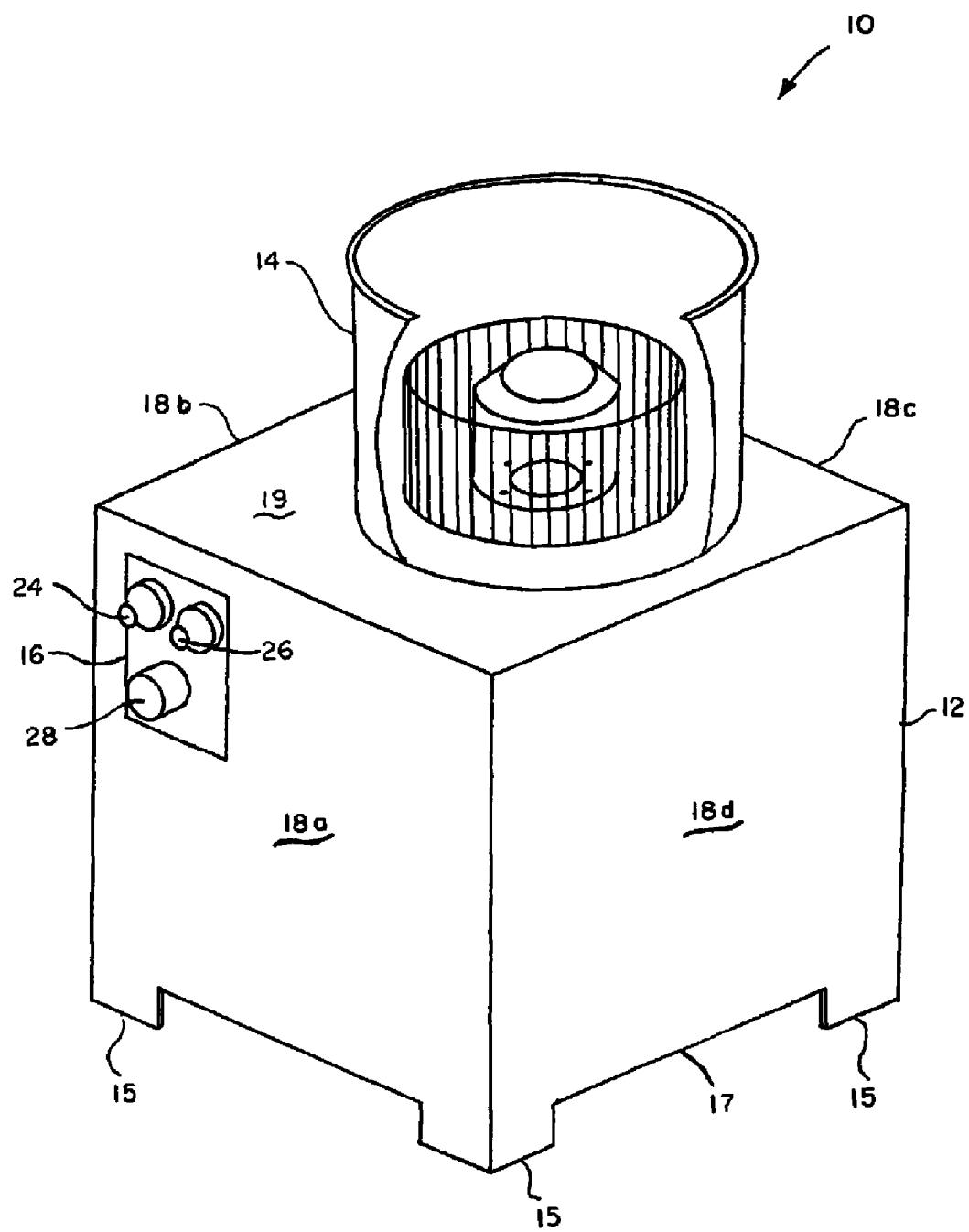
F I G. 1

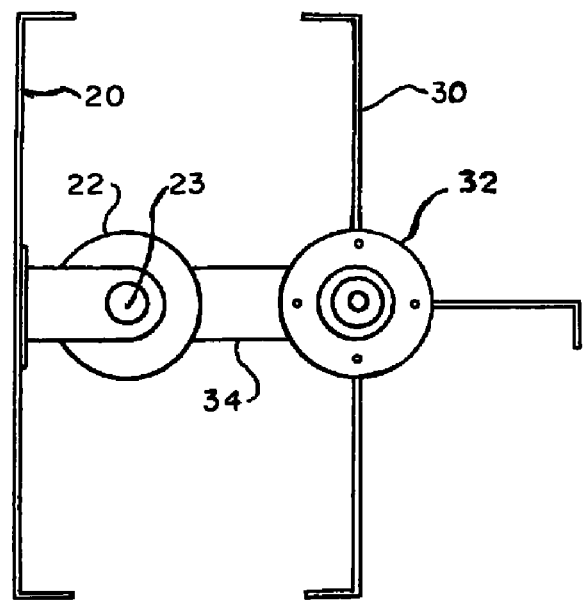
F I G. 2
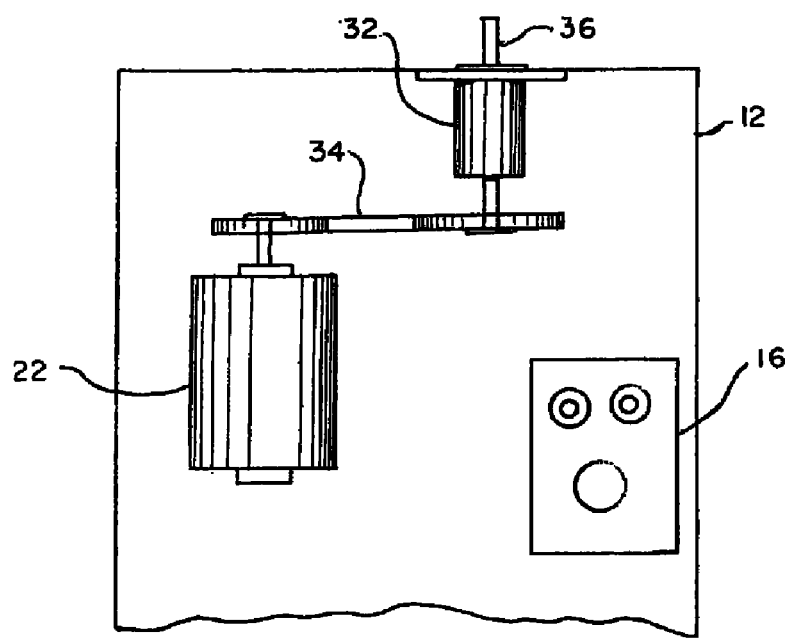
F I G. 3

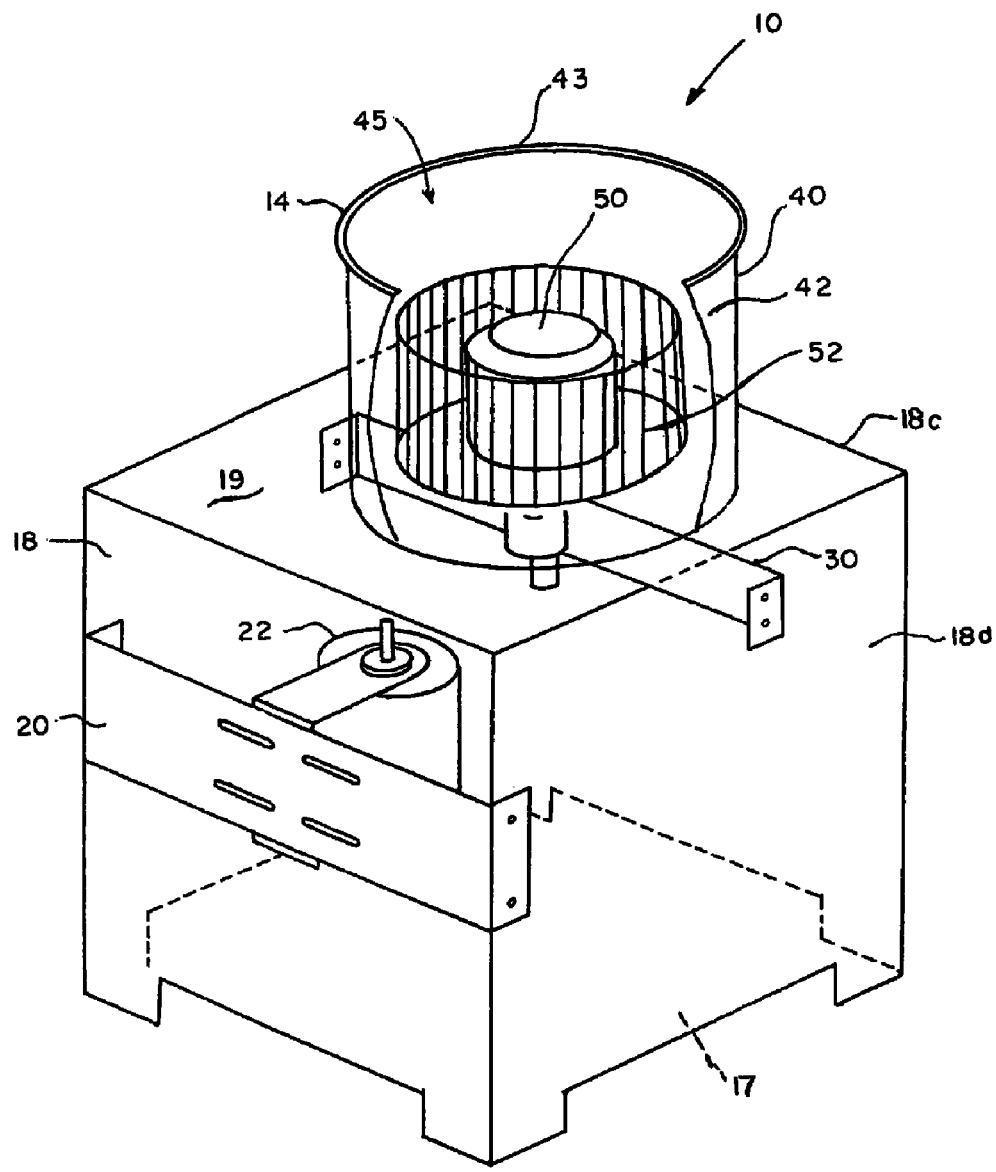
F I G . 4

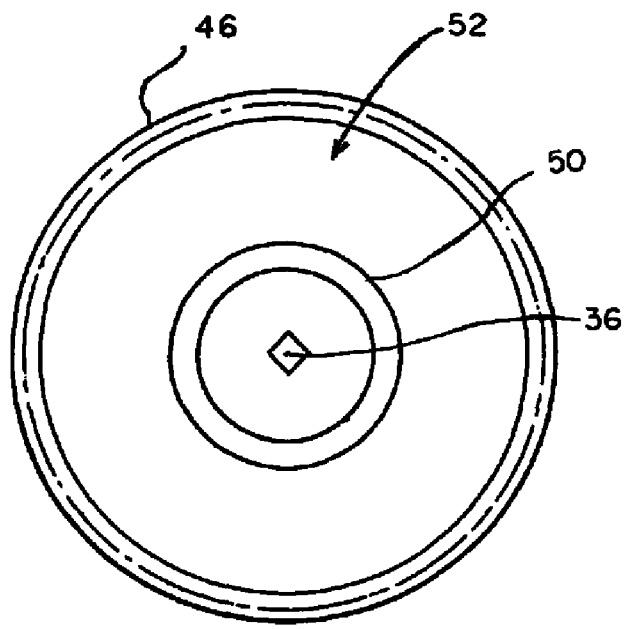
F I G. 5
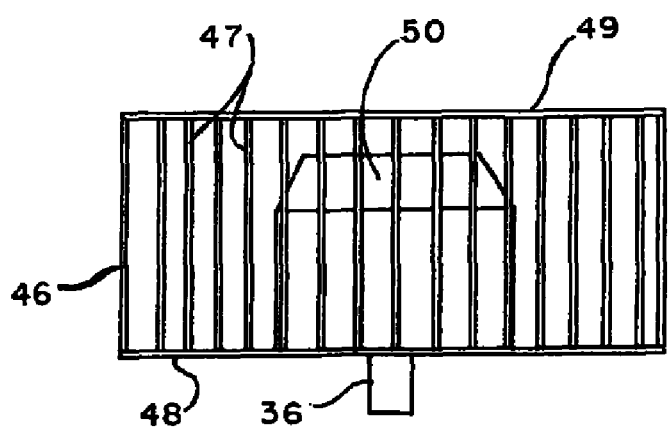
F I G. 6

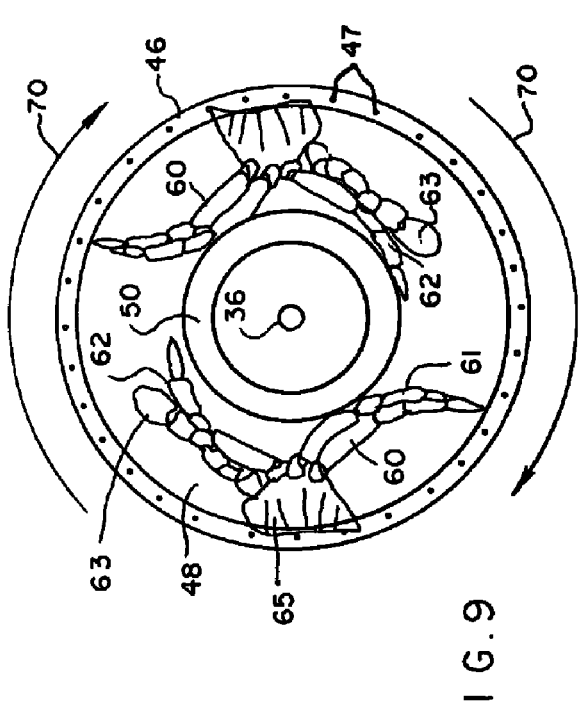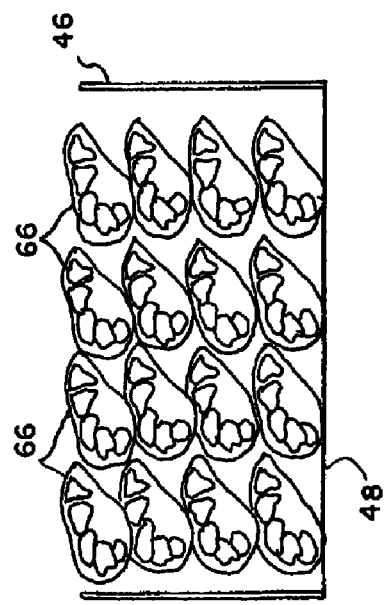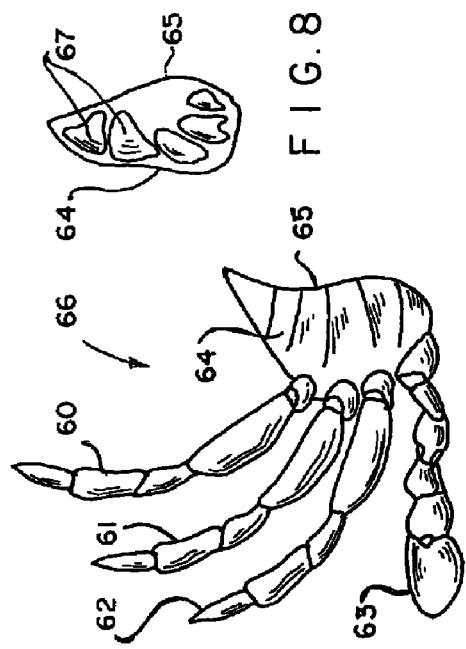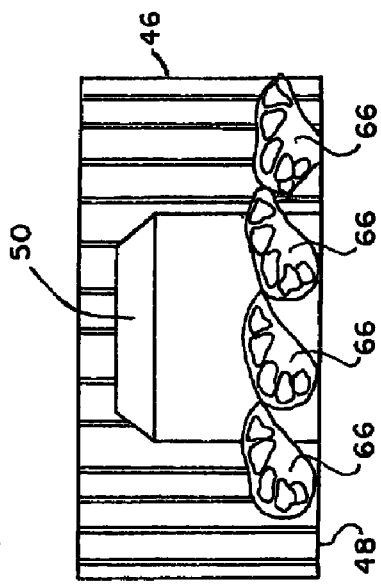

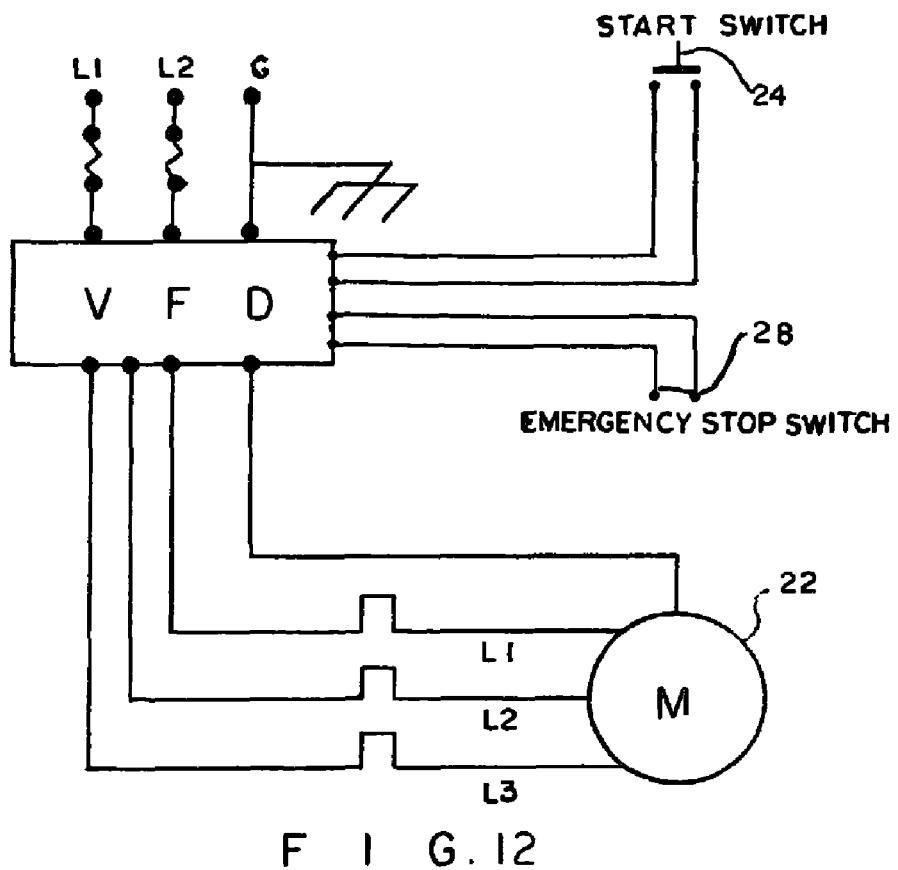
F I G. 12
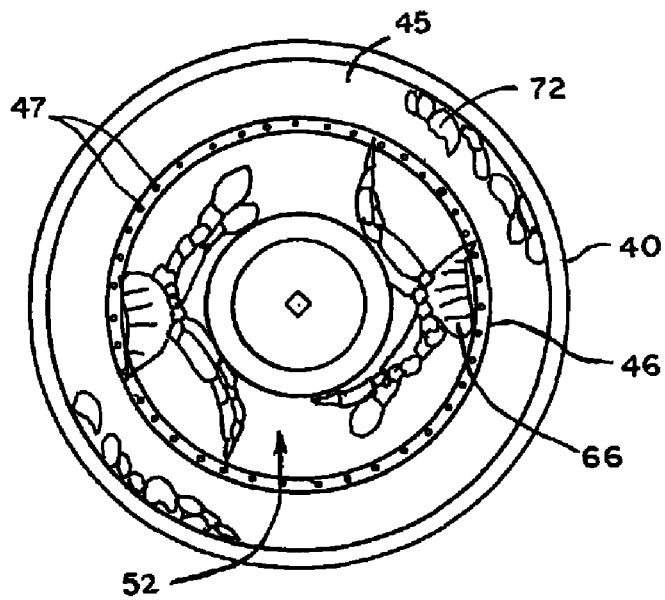
F I G. 13

APPARATUS AND METHOD FOR EXTRACTING CRUSTACEAN MEAT

BACKGROUND OF THE INVENTION

This invention relates to an apparatus and method for the extraction of crustacean meat from the shell structure of the crustacean by centrifugal force. More particularly, the invention relates to an apparatus and method of extracting crabmeat from the shell.

Centrifugal machines for extracting crabmeat are known in the industry. For instance, U.S. Pat. No. 1,533,018 issued on Apr. 7, 1925 teaches a centrifugal type crabmeat separator. The machine uses a rotatable container with a rack. The rack has a plurality of radially arranged open-ended compartments separated by rods into inner and outer chambers. A wall with small openings is mounted midway between the inner and outer compartments to hold the shells of the crustaceans, while allowing the meet to pass therethrough.

U.S. Pat. No. 1,565,341 issued on Dec. 15, 1925 discloses a rotatable pan with perforated circumferential partition or grating dividing the pan into inner and outer compartments. The grating retains the shells, while the meat is separated by centrifugal force and is moved into the outer compartment.

U.S. Pat. No. 2,104,027 issued on Jan. 4, 1938 teaches the use of a cylindrical bowl mounted for rotation at a speed of about 1800 rpm. A series of meat-receiving drawers are removably mounted in the bowl around the sidewall. On the wall is fitted an open top provided with inwardly projecting ribs dividing the outer part into channels. The channels are configured to retain a body holder and meat drawer. Each holder has a pair of vertical sidewalls connected at their upper and lower ends by arcuate members, which in turn are connected by spaced bars.

U.S. Pat. No. 3,229,325 issued on Jan. 18, 1966 discloses a centrifugal-type machine for extracting crabmeat. The machine has a spinning basket, a plurality of vertical pins secured to the base of the basket in two sets—the inner set and the outer set. A perforated annular plate retains the crabs in the basket.

U.S. Pat. No. 3,597,792 issued on Aug. 10, 1971 teaches a machine with carrier trays, which are mounted for rotation by a variable speed electric motor having controls selectively enabling rotation of the carriers at different speeds for predetermined time intervals such as to cause expulsion from the crab body compartments first of the lump meat sections in unbroken form, followed by expulsion of the smaller flake meat sections.

U.S. Pat. No. 4,752,988 issued on Jun. 28, 1988 discloses a method, according to which the crabs are cooked and then have their claws trimmed, brushed, cut in half longitudinally and placed on a spinning disc for centrifugally removing the crabmeat. The sliced surfaces of the body sections face radially outward. The separated meat then passes through the openwork barrier and is collected by a plurality of cup-like receptacles located radially outward from the open work barrier.

U.S. Pat. No. 5,149,294 issued on Sep. 22, 1992 discloses the use of shell crushing device and a subsequent separation means in which the meat is separated from the shell fragments, at least partially, through a centrifugal force effect. The meat separation assembly comprises a rotary tray adapted to be supplied with a mixture of meat and shells and wherein a number of upright (vertical or steeply inclined) separation-wall-defining adjacent members are arranged along the path of a closed ring. The separated meat is collected within an annular space externally of the adjacent members.

While these machines may work satisfactory under certain circumstances, there is a need for a meat extraction machine and method that would allow processing of large quantities of crustaceans during one rotating cycle.

SUMMARY OF THE INVENTION

It is, therefore, an object of the present invention to provide a crustacean processing apparatus and method that allows processing of a large quantity of crustaceans. It is another object of the invention to provide an apparatus and method for extracting crustacean meat from shells using centrifugal force.

It is a further object of the invention to provide an apparatus of method for extracting crustacean meat, which can be used in restaurants and seafood processing plants.

These and other objects of the invention are achieved through a provision of an apparatus for centrifugally extracting meat from crab bodies that have their carapace (top shell) removed, abdomen shell retained, and remaining body divided in half about a center line. The apparatus has a hollow housing, a rotating power source mounted in the housing, a spin assembly operationally connected to the rotating power source and a cage assembly rotatably connected to the spin assembly.

The cage assembly comprises a drum having a continuous wall, a cage mounted inside the drum and a spacer member removably positioned in the cage in a co-axial relationship thereto. Crustacean body portion are placed in the said cage in a selected orientation such that legs of the crab bodies contact the spacer member while centerlines of the crab bodies face away from a center of rotation. Application of centrifugal force to the cage assembly causes crabmeat to separate from the crab portions and exit the cage to enter into an annular space between the continuous wall of the drum and the cage.

In one the preferred embodiments, the cage is spun first at about 600 rpm for 30 seconds and the speed of rotation is increased to about 1700 rpm. This variable speed application causes the crab legs to partially encircle the spacer member and firmly position the shell for expeditious crabmeat extraction.

BRIEF DESCRIPTION OF THE DRAWINGS

Reference will now be made to the drawings, wherein like parts are designated by like numerals, and wherein FIG. 1 is a perspective, partially cut-away view of the apparatus of the present invention.

FIG. 2 is a detail top view of the drive assembly.

FIG. 3 is a detail side view of the drive assembly and schematic view of the control panel.

FIG. 4 is a perspective view of the apparatus of the present invention showing inner brackets supporting the drive assembly.

FIG. 5 is a detail top view of the cage of the apparatus of the present invention.

FIG. 6 is a detail side view of the cage of the apparatus of the present invention.

FIG. 7 illustrates a crab half prepared for placing into the extraction cage of the apparatus of the present invention.

FIG. 8 illustrates a portion of the crab with meat compartments.

FIG. 9 is a detail top view illustrating positioning of crab portions in the extraction cage.

FIG. 10 is a detail side view of the cage showing position of crab portions in the cage.

FIG. 11 schematically illustrates stacking of crab portions in the cage.

FIG. 12 is a wiring diagram of the apparatus of the present invention.

FIG. 13 illustrates extraction of the crustacean meat during spinning of the spin assembly.

DETAIL DESCRIPTION OF THE INVENTION

Turning now to the drawings in more detail, numeral 10 designates the apparatus of the present invention. The apparatus 10 comprises a housing 12, which can be positioned in a desired location, such as seafood processing plant, restaurant and the like. The housing supports a spin assembly 14 mounted on a top 19 of the housing 12. A control panel 16 is secured on a sidewall 18a of the housing 12. In one aspect of the invention, the housing 12 has a parallelepiped shape and is supported by a plurality of legs 15. The housing 12 has parallel sidewalls 18, 18b, 18c, and 18d, a closed bottom 17 and the top 19.

Mounted inside the housing 12 and attached to the interior of the sidewall 18, is a bracket 20, which supports a power source, such as motor assembly 22. In one exemplary embodiment, the bracket is about 24" long and extends transversely to a vertical axis of the housing 12 and the sidewall 18a. The motor assembly 22 is operationally connected to the control panel 16 and more specifically to a start switch 24, a stop switch 26, and an emergency stop switch 28. In one aspect of the invention, the motor assembly comprises a variable frequency drive (VFD) three-phase 230VAC 60 Hz electric power supply.

The sidewall 18c supports a second bracket 30, on which an interior portion 32 of the spin assembly is mounted. The spin assembly 14 is operationally connected to a drive shaft 23 of the motor assembly 22 by a drive belt 34. The motor assembly 22 transmits rotational force to the interior portion 32 of the spin assembly 14 via a driven shaft 36.

An exterior part of the spin assembly 14 extends above the top 19 of the housing 12. A cage assembly 40 is mounted in co-axial alignment with the driven shaft 36. The cage assembly 40 comprises a cylindrical drum 42 mounted on the top 19 of the housing 12. The drum 42 has an open top 43 and a solid continuous wall.

A rotating cage 46 is co-axially fitted in the drum 43. A first annular space 45 is formed between an interior wall of the drum 42 and the cage 46. The cage 46 is formed by a plurality of elongated vertical rods 47 arranged in a circular fashion and secured at their bottoms to a cage bottom plate 48 and at their upper ends—by a ring 49. The cage rods 47 can be formed from a strong non-corrosive material, for example stainless steel. In one exemplary embodiment, the rods were about 6" long and about ⅛" thick; the rods were spaced at a distance of about 0.8" apart.

The cage bottom plate 48 receives torque from the driven shaft 36. The cage 46 is open on top allowing positioning of crustaceans in the cage. If desired, a cover can be placed over the drum 42 and the cage to prevent any potentially escaping particles or water from littering the floor of the processing plant or restaurant.

A spacer member 50 is positioned in co-axial alignment within the cage 46. The spacer member 50 can be removed and replaced with another spacer member having a different diameter, as will be explained in more detail hereinafter. A second annular space 52 is formed between the cage 46 and the exterior of the spacer member 50. The driven shaft 36 extends through the spacer member 50 and imparts torque thereon. In one exemplary embodiment, the cage 46 has a 13-inch diameter and the spacer member has a 6-inch diameter. The spacer member 50 has a continuous exterior wall 54, the bottom of which is positioned on the cage bottom plate 48.

To prepare the crustaceans for processing in the apparatus 10, live crustaceans are sorted by size, which will dictate the size of the spacer member 50 placed in the drum 40. A predetermined batch of the selected crabs is treated by heat or pressure to a degree sufficient to kill bacteria in the crab bodies. In one exemplary embodiment, the crabs were steamed or boiled in water at about 245° F. for 17-20 minutes and then allowed to remain in the cooking liquid for about 20 minutes. The crabs are then removed from the cooking vessel and allowed to cool to ambient temperature.

The main claws, the top shell (carapace) of the crab are removed; the lungs and other inedible parts of the crab are then cleaned. The crab bodies are then broken roughly in half along a vertical center axis 65. To better understand the process of the crustacean meat extraction, reference will be made to FIGS. 7 and 8 illustrating a crab body and location of meat compartments. As can be seen in FIG. 7, the legs 60, 61, 62, and swimmers 63 remain attached to a hard abdomen shell 64 of the crab half 66. Inside the shell, the meat compartments 67 are exposed after the carapace has been removed.

The crab halves 66 are placed in the cage 46 with the middles 65 facing outwardly from the center of the cage 46. The abdomen shell 64 faces upwardly, while the legs 60-63 face the center of rotation. The legs 60, 61 are forced apart from the legs 62, 63 and placed around the spacer member 50, as shown in FIG. 9 such that the legs at least partially surround the spacer member. The stiff legs 60-63 provide support to the position of the crab portions 66 and prevent their moving within the cage 46.

Part of the abdomen shell 65 may extend between the rods 47 of the cage 46. The crab portions are lined in the cage 46 in rows, as shown in FIG. 10, using the abdomen shells 64 of one shell as a support for the shell 64 of an adjacent crab portion 66.

The crab portions 66 are then stacked in vertical rows, as shown in FIG. 11, until they reach the top of the cage 46 without blocking the meat compartment 67 of the crab portions 66. The second annular space 52 between the spacer member 50 and the rods 47 is large enough to accommodate the crab portions and the spread legs 60-63. If the crabs are large, the spacer member 50 can be of a smaller diameter, while for smaller crabs, the spacer member 50 can be selected of a larger diameter. The reason for the different diameter spacer member 50 is to ensure that the crab portions 66 fit tightly within the annular space 52 and not become displaced during rotation of the cage 46.

Once the cage 46 is loaded with the crab portions 66, the user activates the power source 22 and imparts rotation to the spin assembly 32. In one of the preferred embodiments, the cage 46 is rotated in the direction of arrows 70 at a speed of about 600 rpm for about 30 seconds and then immediately increased to about 1700 rpm. The stepped up rotation speed allows the crab legs 60-62 to firmly position themselves against the spacer member 50.

Then, as the crab is spun in the apparatus of this invention, the crab meat is forced by the centrifugal forces out of the crab shell and expelled from the cage into the first annular space 45 between the interior wall of the drum 40 and the cage 46, as illustrated in FIG. 13. Once substantially all meat has been extracted, the operator deactivates the power source 22 allowing the spinning cycle to complete and removes the half portions of the crab from the cage 46. The extracted meat chunks and lumps 72 are collected, sorted to make sure there are no broken shell pieces and packaged as desired.

When the crab halves are properly positioned and supported, the natural strength of the legs prevents shifting of the crab portions in the cage 46, while the strong abdomen shell supports the meat during the spinning cycle. Since the connective tissue of the crab has been weakened during pre-cooking of the crabs, extraction of the crabmeat is facilitated and any shell breakage is substantially eliminated.

In the preferred embodiment, the crab portion is supported at multiple points using the somewhat rigid spread out legs and the abdomen shell against the cage rods, the bottom plate and the shells of adjacent crab portions.

Many changes and modifications can be made in the design of the present invention without departing from the spirit thereof. I, therefore, pray that my rights to the present invention be limited only by the scope of the appended claims.

We claim:

1. An apparatus for centrifugally extracting meat from crustacean bodies comprising:
    a housing;
    a rotating power source mounted in the housing;
    a spin assembly operationally connected to the rotating power source;
    a cage assembly rotatably connected to the spin assembly, said cage assembly comprising a drum having a continuous wall, a cage mounted inside the drum and a spacer member removably positioned in the cage in a co-axial relationship thereto, said cage receiving crustacean bodies in a selected orientation such that legs of the crustacean bodies contact the spacer member while longitudinal axis of the crustacean body faces away from a center of rotation, and wherein application of centrifugal force on the cage assembly causes crustacean meat to separate from the crustacean bodies and exit the cage to enter into an annular space between the continuous wall of the drum and the cage.

2. The apparatus of claim 1, wherein the spacer member has a selected diameter corresponding to size of the crustacean bodies positioned in the cage and facilitating contact of the legs of the crustacean bodies with the spacer member.

3. The apparatus of claim 1, wherein the crustacean bodies comprise portions of crabs divided in half substantially along the longitudinal axis and forming a centerline.

4. The apparatus of claim 3, wherein diameter of the spacer member is selected to allow centerlines of the crab portions to contact the cage.

5. The apparatus of claim 4, wherein said crab portions include abdomen shells and wherein the selected orientation places the abdomen shells facing upwardly within the cage.

6. The apparatus of claim 1, said cage assembly comprising a rotating bottom plate mounted to receive torque from the spin assembly.

7. The apparatus of claim 6, said cage comprising a plurality of spaced-apart vertical rods having their upper ends secured by a ring member and having their lower ends engaging the bottom plate.

8. The apparatus of claim 7, said vertical rods being spaced apart at a distance of about 0.8" from each other.

9. An apparatus for centrifugally extracting meat from crab bodies having carapace removed, abdomen shell retained, and remaining body divided in half about a center line, the apparatus comprising:
    a housing;
    a rotating power source mounted in the housing;
    a spin assembly operationally connected to the rotating power source;
    a cage assembly rotatably connected to the spin assembly, said cage assembly comprising a drum having a continuous wall, a cage mounted inside the drum and a spacer member removably positioned in the cage in a co-axial relationship thereto, said cage receiving halves of the crab bodies in a selected orientation such that legs of the crab bodies contact the spacer member while center lines of the crab bodies face away from a center of rotation, and wherein application of centrifugal force on the cage assembly causes crab meat to separate from the crab bodies and exit the cage to enter into an annular space between the continuous wall of the drum and the cage.

10. The apparatus of claim 9, wherein the spacer member has a selected diameter corresponding to size of the crab bodies positioned in the cage to facilitate contact of the legs of the crab bodies with the spacer member and contact of the center line with the cage.

11. The apparatus of claim 9, wherein the selected orientation places the abdomen shells facing upwardly within the cage.

12. The apparatus of claim 9, wherein the spacer member is detachably positioned in the cage and can be replaced by a different diameter spacer member depending on the size of the crab bodies.

13. The apparatus of claim 9, said cage assembly comprising a rotating bottom plate mounted to receive torque from the spin assembly.

14. The apparatus of claim 13, said cage comprising a plurality of spaced-apart vertical rods having their upper ends secured by a ring member and having their lower ends engaging the bottom plate.

15. The apparatus of claim 14, said vertical rods being spaced apart at a distance of about 0.8" from each other.

16. A method of centrifugally extracting meat from crab bodies comprising the steps:
    providing a housing, a rotating power source mounted in the housing, a spin assembly operationally connected to the rotating power source, a cage assembly rotatably connected to the spin assembly, said cage assembly comprising a drum having a continuous wall, a cage mounted inside the drum and a spacer member removably positioned in the cage in a co-axial relationship thereto;
    treating the crab bodies by heat or pressure to a degree sufficient to kill bacteria in the crab bodies;
    removing claws and carapace from the crab bodies, while retaining portions of the crab bodies with legs and abdomen shell;
    dividing the remaining portions along a centerline;
    placing the crab portions in a selected orientation within the cage such that the legs of the crab portions contact the spacer member while centerlines of the crab portions face away from a center of rotation;
    applying sufficient centrifugal force to the crab portions in the cage assembly to cause separation of crabmeat from the crab portions and expelling of the crabmeat from the cage into an annular space between the continuous wall of the drum and the cage.

17. The method of claim 16, wherein the crab bodies are steamed or boiled in water at a temperature of about 245 degrees Fahrenheit for a period of 17 to 20 minutes.

18. The method of claim 17, comprising a step of retaining the bodies in a cooking liquid for about 20 minutes, then removing the crab bodies from the cooking liquid and allowing the crab bodies to cool to ambient temperature.

19. The method of claim 16, the step of applying centrifugal force comprises a step of rotating the cage at about 600 rpm for about 30 seconds and then increasing speed of rotation to about 1700 rpm.

20. The method of claim 16, wherein the cage comprises a plurality of vertical spaced apart rods arranged to form a circular cage.

21. The method of claim 20, wherein said vertical rods are spaced apart at a distance of about 0.8" from each other.

22. The method of claim 20, wherein the spacer member has a selected diameter corresponding to size of the crab portions positioned in the cage such that the legs of the crab portions partially encircle the spacer member, while center lines of the crab portions contact the vertical rods of the cage.

23. The method of claim 22, wherein the spacer member is detachably positioned in the cage and can be replaced by a different diameter spacer member depending on the size of the crab portions.

24. The method of claim 16, wherein said cage assembly comprises a rotating bottom plate mounted to receive torque from the spin assembly.

25. The method of apparatus of claim 24, said cage comprising a plurality of spaced-apart vertical rods having their upper ends secured by a ring member and having their lower ends engaging the bottom plate.

26. The method of claim 16, wherein the crab portions are placed in the cage with the abdomen shells facing upwardly.

27. The method of claim 26, comprising a step of positioning a plurality of crab portions in the cage in a selected orientation of horizontal and vertical rows such that the abdomen shells of the crab portions are supported at least in part by abdomen shells of adjacent crab portions.

* * * * *